United States Patent
Demchenko et al.

(10) Patent No.: US 12,206,745 B2
(45) Date of Patent: Jan. 21, 2025

(54) PRIVACY-PRESERVING CROSS-DOMAIN USER TRACKING

(71) Applicant: ID Ward Ltd, Nottingham (GB)

(72) Inventors: Denys Demchenko, Nottingham (GB); Almatkhan Kuanyshkereyev, Nottingham (GB); Mattia Fosci, Barcelona (ES)

(73) Assignee: ID Ward Ltd, Nottingham (GB)

( * ) Notice: Subject to any disclaimer, the term of this patent is extended or adjusted under 35 U.S.C. 154(b) by 0 days.

(21) Appl. No.: 18/329,817

(22) Filed: Jun. 6, 2023

(65) Prior Publication Data
US 2023/0396692 A1 Dec. 7, 2023

(30) Foreign Application Priority Data
Jun. 7, 2022 (GB) .................................... 2208334

(51) Int. Cl.
*H04L 67/50* (2022.01)
*G06F 21/62* (2013.01)

(52) U.S. Cl.
CPC ........ *H04L 67/535* (2022.05); *G06F 21/6254* (2013.01); *G06F 21/6263* (2013.01)

(58) Field of Classification Search
CPC ..... H04L 67/535; H04L 67/146; H04L 67/53; H04L 63/0421; H04L 67/02; G06F 21/6254; G06F 21/6263
See application file for complete search history.

(56) References Cited

U.S. PATENT DOCUMENTS

| | | | |
|---|---|---|---|
| 2011/0061095 A1* | 3/2011 | Wiseman | G06Q 20/12 709/227 |
| 2013/0086656 A1 | 4/2013 | Paddon et al. | |
| 2013/0227057 A1* | 8/2013 | Goldstein | H04L 43/08 709/217 |
| 2014/0059343 A1 | 2/2014 | Mohajeri et al. | |
| 2014/0344038 A1* | 11/2014 | Sato | G06Q 30/02 705/14.16 |

(Continued)

FOREIGN PATENT DOCUMENTS

| WO | WO-2010048980 | 5/2010 |
|---|---|---|
| WO | WO-2019211607 | 11/2019 |

OTHER PUBLICATIONS

EPO, "EP Application No. 23177001.7 Search Report mailed Oct. 6, 2023", 7 pages.

(Continued)

*Primary Examiner* — El Hadji M Sall
(74) *Attorney, Agent, or Firm* — Strategic Patents, P.C.

(57) ABSTRACT

Systems and methods for privacy-preserving cross-domain tracking comprise, for each request received at an authentication server from a device associated with a user: obtaining, at the authentication server, a parent identifier, wherein the parent identifier is a pseudonymous identifier which is unique for the user; obtaining, at the authentication server, a child identifier, wherein the child identifier is associated with a software agent of the user and a domain associated with said each request; and linking, at the authentication server, the parent identifier and the child identifier thereby anonymously tracking the software agent of the user across one or more domains associated with said each request.

20 Claims, 6 Drawing Sheets

(56) References Cited

U.S. PATENT DOCUMENTS

2015/0262199 A1    9/2015  Taylor et al.
2020/0014538 A1*   1/2020  Liu .................... H04L 9/3231
2020/0065463 A1*   2/2020  Ryu .................... G06V 40/18
2021/0320914 A1   10/2021  Pillai

OTHER PUBLICATIONS

UKIPO, "UK Application No. 2208334.9 Examination Report mailed Sep. 26, 2023", 5 pages.
UKIPO, "UK Application No. 2208334.9 Search Report mailed Nov. 22, 2022", 1 Page.

* cited by examiner

PRIVACY-PRESERVING CROSS-DOMAIN USER TRACKING

CROSS-REFERENCE TO RELATED APPLICATIONS

This application claims priority to United Kingdom Patent Application No. 2208334.9 filed on Jun. 7, 2022, the entire contents of which are incorporated by reference herein.

FIELD OF INVENTION

The present disclosure relates to cross-domain tracking of a user agent. Particularly but not exclusively, the present disclosure relates to the use of parent and child identifiers to track a user agent across domains whilst maintaining privacy; more particularly, the present disclosure relates to utilizing the parent and child identifiers to offer privacy-preserving content personalisation services.

BACKGROUND

Many web-based personalisation services rely on the ability to identify individuals across domains to understand user interests and assign users to specific groups for targeted personalisation. However, the "same-domain" architecture of the Internet requires data to be kept within the domain where it was generated. To circumvent this problem, various cross-domain technologies have been developed. Examples of such technologies include third-party cookies, browser and device fingerprinting, mobile identifiers such as the identifier for advertisers (IDFA) and the Google advertising ID (GAID), and the like.

In general, cross-domain tracking is design to: (a) identify the individual; (b) collect personal data about the data; and (c) make such data interoperable and interchangeable with third parties (thus enriching the data). This enables third parties to focus their personalisation services more accurately to a user's preferences. Although these cross-domain technologies have supported a free-to-use Internet, and have delivered numerous benefits to users, they have also been determinantal to user privacy.

Owing to the privacy issues associated with cross-domain tracking, the above technologies are being phased out by browser and operating system developers. Moreover, application and usability of traditional cross-domain tracking technologies are set to be restricted over the coming years.

As such, there is a need for cross-domain tracking which maintains user privacy whilst providing effective content personalisation services.

SUMMARY OF INVENTION

According to an aspect of the present disclosure, there is provided a method for privacy-preserving cross-domain user tracking. The method comprises, for each request received at an authentication server from a device associated with a user, obtaining, at the authentication server, a parent identifier, wherein the parent identifier is a pseudonymous identifier which is unique for the user; obtaining, at the authentication server, a child identifier, wherein the child identifier is associated with a software agent of the user and a domain associated with said each request; and linking, at the authentication server, the parent identifier and the child identifier thereby anonymously tracking the software agent of the user across one or more domains associated with said each request. Optionally, obtaining the parent identifier comprises generating, at the authentication server, the parent identifier. The step of generating the parent identifier occurs in accordance with a determination, at the authentication server, that the parent identifier is stored on the device. Alternatively, obtaining the parent identifier comprises sending, from the authentication server to the device, a request for the parent identifier; and receiving, from the device, the parent identifier.

Optionally, obtaining the child identifier comprises generating, at the authentication server, the child identifier. Alternatively, obtaining the child identifier comprises regenerating, at the authentication server, the child identifier in accordance with a determination that a predetermined condition has been met. Optionally, the predetermined condition is met when a predetermined period of time has elapsed since the child identifier was previously generated. Alternatively, obtaining the child identifier comprises receiving, from the device, the child identifier. Optionally, the child identifier is generated according to a predetermined mathematical function.

Optionally but preferably, linking the parent identifier and the child identifier further comprises storing, at the authentication server, a link between the parent identifier and the child identifier in a persistent data store.

Optionally, the child identifier is sent from the authentication server to the device as a session token.

According to an additional aspect of the present disclosure, there is provided a method implemented at a user device. The method comprises obtaining a child identifier, wherein the child identifier identifies a software agent associated with a user of the user device on a domain; obtaining user generated data stored on the user device, wherein the user generated data is associated with activity of the user of the user device on the domain based on the child identifier; providing the user generated data to a prediction model; obtaining, from the prediction model, a first group identifier based on the user generated data provided to the prediction model, wherein the first group identifier is indicative of a characteristic of a group of users; and providing the first group identifier to a third-party.

Optionally but preferably, the prediction model is stored on the user device. Optionally, the prediction model comprises a trained machine learning model.

Optionally, obtaining the child identifier comprises sending, to an authentication server, a request indicating that the user device has requested to visit the domain; and receiving, from the authentication server, the child identifier.

Optionally, the method further comprises storing the first group identifier on the software agent of the user device.

According to a further aspect of the present disclosure, there is provided a computer-readable medium comprising instructions which, when executed by one or more processors, cause the one or more processors to carry out the steps of any of the methods of the present disclosure.

Optionally, the computer-readable medium is a non-transitory computer-readable medium.

According to an additional aspect of the present disclosure, there is provided a device comprising one or more processors and a memory storing instructions which, when executed by the one or more processors, cause the one or more processors to carry out the steps of any of the methods of the present disclosure.

According to a further aspect of the present disclosure there is provided a system comprising a device comprising a software agent associated with a user; and an authentication server configured to receive one or more requests from the device. The device is further configured, for each of the one or more requests received from the device, to obtain a parent identifier, wherein the parent identifier is a pseudonymous identifier which is unique for the user; obtain a child identifier, wherein the child identifier is associated with the software agent of the user and a domain associated with said each of the one or more requests; and link the parent identifier and the child identifier thereby anonymously tracking the software agent of the user across one or more domains associated with said one or more requests.

Optionally, the authentication server is further configured to send to the device a request for the parent identifier; and wherein the device is further configured to in response to receiving the request for the parent identifier, send to the authentication server a response to the request. Optionally, the authentication server is further configured to receive from the device the parent identifier in accordance with a determination that the parent identifier is included as part of the response. Alternatively, the authentication server is further configured to generate the parent identifier in accordance with a determination that the parent identifier is not included as part of the response.

Optionally but preferably, the device is further configured to obtain user generated data stored on the device, wherein the user generated data is associated with activity of the user on the domain based on the child identifier; provide the user generated data to a prediction model; and obtain, from the prediction model, a first group identifier based on the user generated data provided to the prediction model, wherein the first group identifier is indicative of a characteristic of a group of users.

Optionally, the prediction model comprises a rule-based algorithm.

Optionally but preferably, the device is further configured to provide the first group identifier to a third-party.

BRIEF DESCRIPTION OF DRAWINGS

The present disclosure will now be described by way of example only with reference to the accompanying drawings in which.

DETAILED DESCRIPTION

Embodiments of the present disclosure will be now described with reference to the attached figures. It is to be noted that the following description is merely used for enabling the skilled person to understand the present disclosure, without any intention to limit the applicability of the present disclosure to other embodiments which could be readily understood and/or envisaged by the reader. In particular, whilst the present disclosure is primarily directed to cross-domain tracking, the skilled person will readily appreciate that the systems, methods, and devices of the present disclosure are applicable to other areas of privacy preserving technology and web technology such as content personalisation services and data anonymisation.

The present disclosure balances privacy protection and personalisation effectiveness thus supporting a free, open, and competitive Internet. Decisively, the present disclosure provides a decentralised architecture which utilises anonymous data—i.e., group identifiers generated with the constraints such as non-descriptiveness, temporal limitation, and rotation—instead of personal data, for content personalisation services. Therefore, no personal data is transferred to third parties thus allowing a user to maintain control of their personal data.

Figure 1:
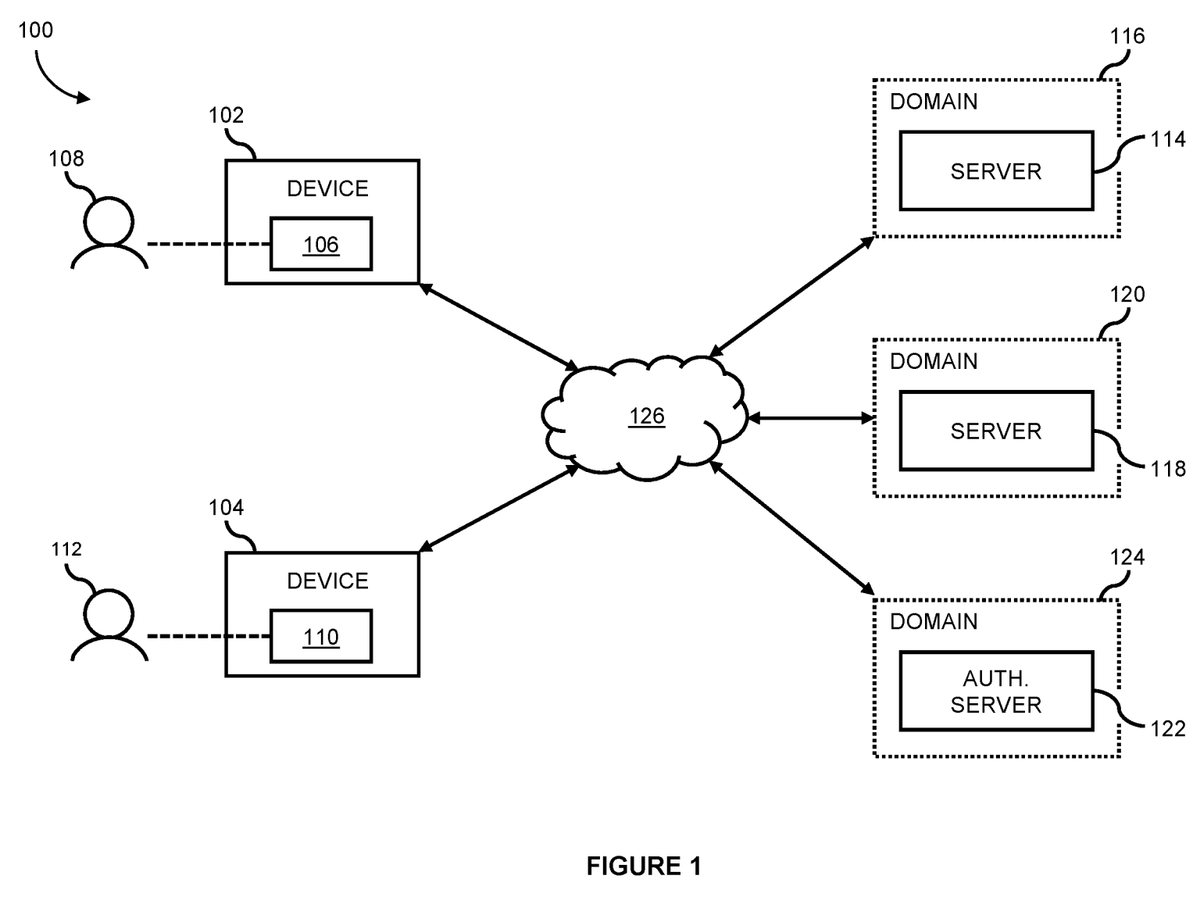
FIG. 1 shows a system for cross-domain tracking according to embodiments of the present disclosure.

FIG. 1 shows a system for cross-domain tracking according to embodiments of the present disclosure.

FIG. 1 shows a system 100 comprising a first device 102 and a second device 104. The first device 102 comprises a first user agent 106 associated with a first user 108. The second device 104 comprises a second user agent 110 associated with a second user 112. The system 100 further comprises a first server 114 associated with a first domain 116, a second server 118 associated with a second domain 120, and an authentication server 122 associated with a third domain 124. The first device 102 and the second device 104 communicate with the first server 114, the second server 118, and the authentication server 122 via an internetwork 126 (e.g. the Internet).

The first device 102 and the second device 104 correspond to any suitable user device or endpoint. Examples of such devices include personal computing devices, mobile devices (e.g. smartphones), and tablet computing devices. Each device includes a user agent, also referred to as a software agent or agent. The user agent corresponds to a program which executes on the device and is associated with a user. More particularly, the user agent corresponds to a program which executes on the device and enables a user of the device to access one or more domains via the internetwork 126 (e.g. the Internet). A web browser is one example of such a user agent. Example web browsers include Google Chrome, Mozilla Firefox, and Microsoft Edge. In some embodiments, particularly where the user device corresponds to a mobile device or tablet computing device, the user agent may correspond to an app (not limited to a web browsing app) executing on the device.

A user of the device utilises the user agent of the device to access one or more domains or websites. For example, the first user 108 uses the first user agent 106 to access the first domain 116 and/or the second domain 120 via the internetwork 126. When a user visits a domain, the domain may place one or more files in a store associated with the user agent on the user device. These files are used to record the activity of the user on the domain. They can help the enterprise or entity controlling the domain to collect data relating to the user so as to provide content personalisation services which can improve the experience of the user on the domain. In some examples, when a user visits a domain, one or more files are placed in a store associated with the user agent on the user device by a third-party (i.e. a party that is not connected with the domain). The purpose of these files is to track the activity of the first user (and other users) across multiple domains. For example, a third-party may place such a file on the first device 102 when the first user 108 visits the first domain 116. When the first user 108 then uses the first device 102 to visit the second domain 120, the file can be used by the third-party to track the activity of the first user on both the first domain 116 and the second domain 120. Examples of such cross-domain technologies include third-party cookies, browser and device fingerprinting, mobile identifiers such as the identifier for advertisers (IDFA) and the Google advertising ID (GAID), and the like. By tracking user activity across multiple domains, more focused and relevant content personalisation can be offered to the user by the third-party.

Although these cross-domain technologies have supported a free-to-use Internet and delivered benefits to users, they are also detrimental to user privacy. Personal data collected from a user as they navigate across domains is exposed to third parties in order to allow the third parties to provide personalisation and other services. It is thus an object of the present disclosure to provide a privacy-preserving cross-domain tracking technology which provides similar benefits as traditional cross-domain technologies whilst maintaining user privacy.

In general, the present disclosure utilises a two-layered identity architecture. A first-party identifier is created for each domain visited by a user (e.g. the first domain 116 and the second domain 120 visited by the first user 108) and is stored on the user device (e.g. the first device 102) along with any data generated by the user on each domain. A unique pseudonymous identifier is created for each user and stored on a secure authentication server (e.g. the authentication server 122). By linking the first-party identifier with the unique pseudonymous identified on the secure authentication server, the user can be deterministically identified across multiple domains without exposing the user activity to third parties. Using the link between multiple first-party identifiers and a unique pseudonymous identifier, user interest data can be transferred across domains thereby allowing content personalisation services to be offered in a privacy-preserving manner.

This process is described in more detail with respect to FIGS. 2 to 5 below.

Figure 2:
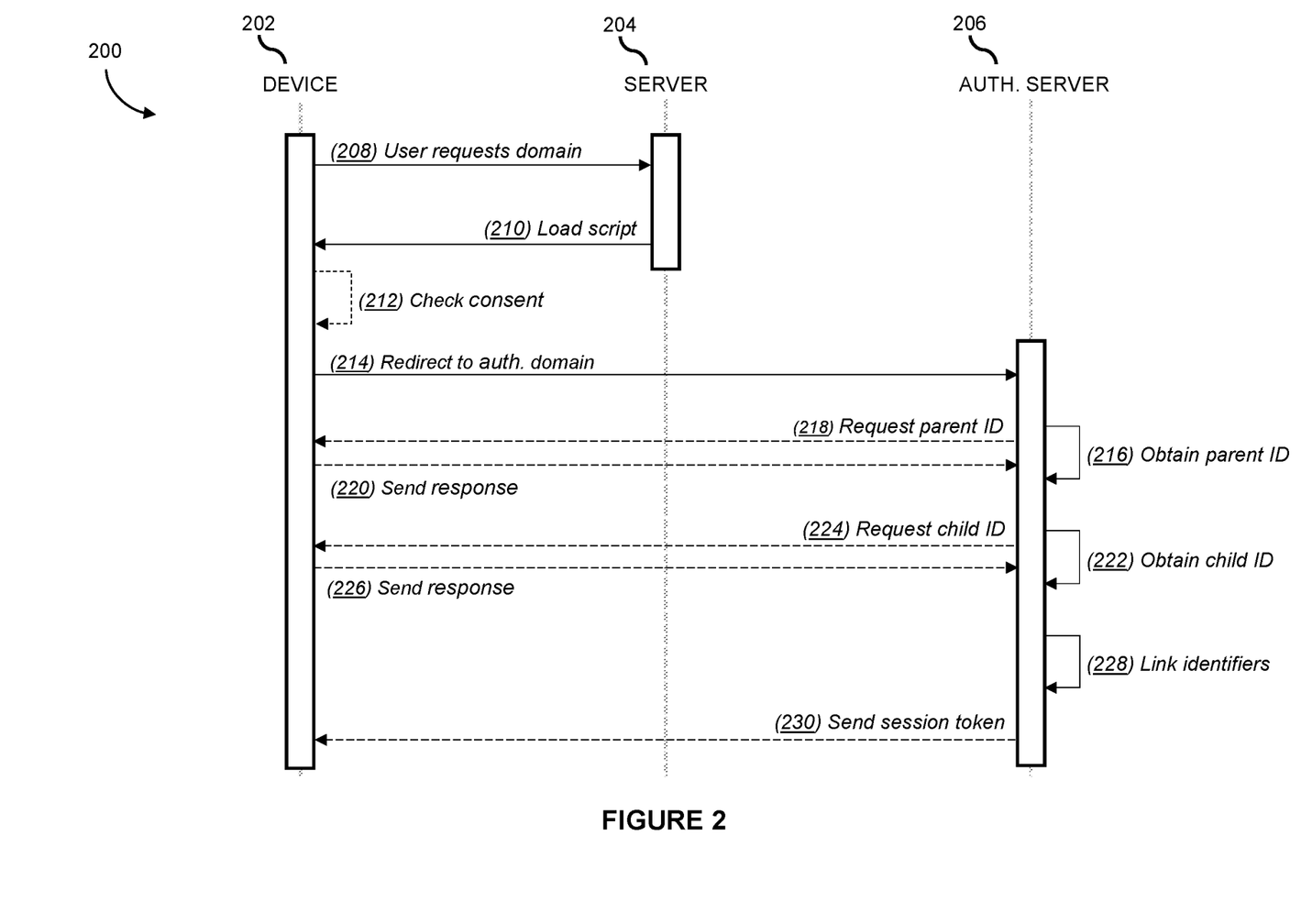
FIG. 2 shows an authentication flow involving the system of FIG. 1 according to an aspect of the present disclosure.

FIG. 2 shows an authentication flow 200 involving the system 100 of FIG. 1 according to an aspect of the present disclosure.

FIG. 2 shows a device 202, a server 204, and an authentication server 206. The device 202 corresponds to either of the first device 102 or the second device 104 shown in FIG. 1. The server 204 corresponds to either of the first server 114 or the second server 118 shown in FIG. 1. The authentication server 206 corresponds to the authentication server 122 shown in FIG. 1.

The device 202 comprises a software agent (e.g. the first user agent 106) associated with a user (e.g. the first user 108). When a user of the device 202 requests to visit a domain, the device 202 communicates with the server 204 associated with the domain. The authentication server 206 is configured to receive one or more requests from the device 202. The one or more requests are associated with the device 202 visiting one or more domains (including the domain associated with the server 204).

At the start of the authentication flow 200, at step 208, the user of the device 202 requests to visit the domain associated with the server 204. More particularly, the user of the device 202 utilises a software agent, or user agent, of the device 202 to visit the domain associated with the server 204. For example, the user may utilise a web browser of the device 202 to visit a website which is hosted by the server 204. The software agent, or user agent, may correspond to any suitable application executing on the device 202.

At step 210 the server 204 sends a script (or plugin) to the device 202 and instructs the user agent of the device 202 to load and execute the script. Alternatively, if the script has already been loaded on the device 202 (e.g. as part of the domain associated with the server 204 being loaded on the user agent of the device 202), then at step 212 a command or message is sent to the user agent of the device 202 to execute the script.

Optionally, prior to executing or loading the script, at step 212 the device 202 checks whether the user has consented to share data. For example, the user may have previously indicated via an online form or the like that they consent to sharing data. At step 212, the device 202 checks a consent status indicating whether the user has consented to share data. The consent status may take the form of a flag or other indicator which identifies whether the user has consented to share data. If the consent status indicates that the user has not consented to share data, then the authentication flow 200 terminates. If the consent status indicates that the user has consented to share data, then the device 202 loads and executes the script.

At step 214, once it has been determined that the user has consented to sharing data and the script is, or has been, executed on the device 202, the device 202 is redirected to the authentication server 206. More particularly, the user agent of the device 202 is redirected to a domain (authentication domain) associated with the authentication server 206.

At step 216, a parent identifier is obtained at the authentication server 206. The parent identifier is a pseudonymous identifier which is unique for the user.

The parent identifier is uniquely associated with the user of the device 202. As such, a user preferably only has a single parent identifier assigned thereto and associated therewith. Alternatively, the parent identifier is uniquely associated with the user agent of the device 202 such that a user agent only ever has a single parent identifier assigned thereto and associated therewith.

In an embodiment, the parent identifier is obtained by the authentication server 206 sending a request to the device 202 at step 218. The request at step 218 is a request for the device 202 to check for the existence of the parent identifier and to send the parent identifier (if it exists). At step 220 the device 202 sends to the authentication server 206 a response to the request sent at step 218. The response indicates whether the parent identifier is stored on the device 202. If the device 202 has the parent identifier stored, then the parent identifier is sent to the authentication server 206 as part of the response sent at step 220. Otherwise, the authentication server 206 utilises the non-existence of the parent identifier in the response sent at step 220 as an indication that the parent identifier is not held on the device 202.

If the parent identifier is not held on the device 202, then the authentication server 206 obtains the parent identifier at step 216 by generating the parent identifier.

The parent identifier is generated according to a predetermined mathematical function. For example, the predetermined mathematical function can generate a unique random identity, such as a unique pseudorandom number, as the parent identifier. Decisively, the process for generating the parent identifier is performed solely by the authentication server 206.

At step 222, the authentication server 206 obtains a child identifier. The child identifier is associated with the software agent of the user on the device 202 and the domain associated with the request made at step 208 (i.e. the domain associated with the server 204).

The child identifier is a first-party identifier that is associated both with the software agent of the user on the device 202 and with the domain which the user wishes to visit. In some embodiments, the child identifier is associated with more than one domain. That is, the same child identifier is used across multiple domains.

In an embodiment, the child identifier is obtained by the authentication server 206 sending a request to the device 202 at step 224. The request is a request for the device to check for the existence of the child identifier and to send the child identifier if it exists. At step 224 the device 202 sends to the authentication server 206 a response to the request sent at step 226. The response indicates whether the child identifier is stored on the device 202. If the device 202 has the child identifier stored, then the child identifier is sent to the authentication server 206 as part of the response sent at step 226. Otherwise, the authentication server 206 utilises the non-existence of the child identifier in the response sent at step 226 as an indication that the child identifier is not held on the device 202.

If the child identifier is not held on the device 202, then the authentication server 206 obtains the child identifier at step 222 by generating the child identifier. In some embodiments, the child identifier is generated according to a predetermined mathematical function. For example, the child identifier can be generated according to a predetermined hash function, fingerprinting function, pseudorandom number generation function, or the like.

In an alternative embodiment, the child identifier is generated by the server 204 or a third-party associated with the domain of the server 204.

As the child identifier is a first-party identifier which is exposed, in some embodiments, at step 222, the child identifier is regenerated, at the authentication server, in accordance with a determination that a predetermined condition has been met. The predetermined condition is met when a predetermined period of time has elapsed since the child identifier was previously generated. This helps prevent any domain or third-party from being able to resolve the child identifier. The predetermined period of time is chosen such that it is short enough to prevent other parties from identifying the child identifier whilst being long enough to avoid the situation whereby the child identifier is unnecessarily regenerated. Such a predetermined period of time may be in the order of weeks.

Alternatively, it may be in the order of a month or more.

At step 228, the parent identifier and the child identifier are linked at the authentication server 206 thereby anonymously tracking the software agent of the user across one or more domains associated with said one or more requests.

The linking performed at step 228 allows the authentication server 206 to identify the same user agent across multiple domains in a deterministic manner. The matching of parent identifiers to child identifiers allows interest data—i.e. data generated by the user at the device, such as clickstream data—to be transferred across domains thereby enriching user profiles associated with each child identifier and improving content personalisation services provided by third parties.

Moreover, the linking performed at step 228 allows each user, or user agent, to be deterministically identified with a one-to-one precision. Existing cross-domain tracking technologies, such as third-party cookies, have to be "synced" or matched with other identifiers in order to identify a user with a degree of certainty. This is referred to as "probabilistic matching", which indicates that the identification of a user, or user agent, is a statistical determination of the likelihood that two different identifiers belong to the same user or user agent. It is known that a significant proportion (approximately 40%) of probabilistic matches fail, meaning that they do not match the correct profiles or identify the wrong user or user agent. By contrast, the linking performed at step 228 provides a deterministic match between children and parent identifiers; meaning that the above issues regarding probabilistic matching are addressed.

The parent identifier and the child identifier are linked by storing the association between the parent identifier and the child identifier within a persistent data store. For example, a database of parent identifiers and child identifiers can be maintained at the authentication server 206. Alternatively, a look-up-table (LUT) of parent identifiers and child identifiers is maintained at the authentication server 206.

In some embodiments, the child identifier is sent from the authentication server 206 to the device 202 at step 230. The child identifier is sent as a session token, first-party cookie, or the like. Optionally, the parent identifier is also sent as part of the session token, first-party cookie, etc.

In some embodiments, after step 230, the device 202 is redirected back to the domain associated with the server 204. Alternatively, the redirect occurs after the child identifier has been obtained at step 222. The redirect to the authentication domain at step 214 and the subsequent redirect back to the domain associated with the server 204 is substantially invisible to the user.

The process described in relation to FIG. 2 allows a user agent associated with a user to be anonymously tracked across multiple domains.

Unlike existing authentication mechanisms, the authentication flow of the present disclosure (as described above in relation to FIG. 2) does not require the user to provide login credentials (e.g. an email address, phone number, or some other deterministic identifier along with a password). Rather, the present disclosure utilises a pseudonymous identifier (the combination of the child and parent identifiers) that is automatically created when the user consents to sharing data. Requiring a user to provide login credentials to perform cross-domain tracking and content personalisation also significantly limits the scalability since repeating a login process on every domain visited inhibits user experience. The present disclosure therefore provides a more convenient and time effective approach for the user which leads to improved privacy (because no deterministic identifier such as an email address is exposed) and improved security (due to the avoidance of losing or leaking passwords). As the present disclosure does not require a user to provide any login credentials, the method is far more scalable than existing authentication mechanisms.

Figure 3:
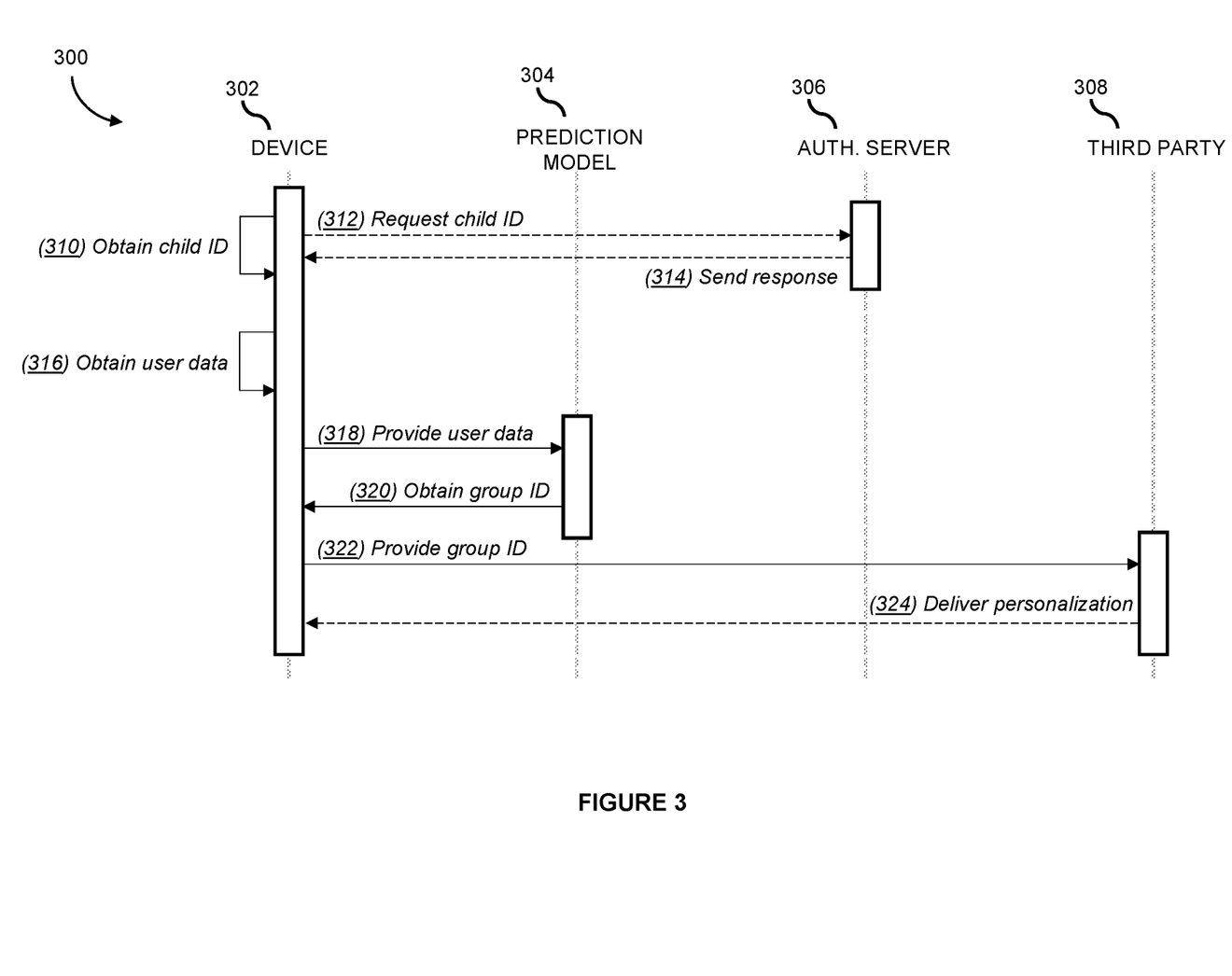
FIG. 3 shows a flow diagram for privacy-preserving personalisation according to an aspect of the present disclosure.

Moreover, the anonymised tracking can be used to provide content personalisation to a user (from a third-party) as described in relation to FIG. 3.

FIG. 3 shows a flow diagram 300 for privacy-preserving personalisation according to an aspect of the present disclosure.

FIG. 3 shows a device 302, a prediction model 304, an authentication server 306, and a third-party 308. The device 302 corresponds to the device 202 of FIG. 2 (i.e. either the first device 102 or the second device 104 of FIG. 1) and the authentication server 306 corresponds to the authentication server 206 of FIG. 2 (i.e. the authentication server 122 of FIG. 1).

As in FIG. 2, the device 302 comprises a software agent associated with a user. In some embodiments, the prediction model 304 is stored on the device 302. Alternatively, the prediction model 304 is stored remotely to the device 302 (e.g. on a cloud server).

At step 310 the device 302 obtains a child identifier which identifies the software agent associated with the user of the device 302 on a domain.

In some embodiments, the step 310 of obtaining the child identifier comprising requesting, at step 312, the child identifier by sending to the authentication server 306 a request indicating that the device 302 has requested to visit the domain. At step 314, the authentication server 306 sends the child identifier to the device 302.

At step 316 the device 302 obtains user generated data stored on the device 302. The user generated data is associated with activity of the user on the domain based on the child identifier.

The user generated data comprises data associated with the activity of the user on the domain. This data includes first-party data such as clickstream data, which comprises a log of user activity across different pages of a domain. Decisively, the user generated data is stored on the device 302. As such, the user generated data is processed on the device 302 and does not need to be transferred to another server or device for processing. Thus, the user is able to maintain control of their data and can keep the data private thereby avoiding the need to expose any personal data to external parties.

At step 318, the user generated data is provided to the prediction model 304.

As will be described in more detail below, the prediction model 304 determines a group identifier, which is indicative of a characteristic of a group of users, from a given set of user generated data. The group identifier corresponds to one of a predetermined set of group identifiers. The set of group identifiers is determined by a third-party (e.g. the third-party 308) or the authority associated with the authentication server 306.

In general, the prediction model 304 utilises a predetermined set of group identifiers to calculate, for each of group identifier, the likelihood that a user agent matches the group identifier. In contrast to clustering based approaches whereby candidate group identifiers are learnt directly from historical data, the prediction model 304 incorporates a priori information regarding the characteristics of the group of users when assigning a user agent to a group identifier. This allows a more controlled and accurate determination of a relevant group identifier to be made.

The prediction model 304 comprises a set of rule-based algorithms that assign a group identifier to a given set of input data (i.e. user generated data) based on one or more rules or conditions being met. Examples of user generated data include the content of web pages visited by a user agent of the device 302, or device specific data such as location, device type, and the like. The prediction model 304 predicts the likelihood of a user agent being assigned to a particular predetermined group identifier based on the user generated data.

The input data comprises a plurality of different data extracted from the user generated data. The input data comprises one or more of categorical data, keyword data, frequency data, recency data, location data, device specific data, and event data. Categorical data corresponds to entities of interest determined from a predetermined standardised taxonomy. For example, a first layer of the taxonomy may correspond to sport, a second layer to football, a third layer to the Premier League, and a fourth layer to Manchester City FC. Thus, an interest in Manchester City FC is assigned the categories, "sport", "football", "Premier League", and "Manchester City FC". Keyword data corresponds to keywords or entities extracted from the user generated data by natural language processing approaches such as named entity extraction and template matching. Frequency data corresponds to the number of times that a user agent has encountered, or observed, a certain category, keyword, or entity over a period of time (e.g., the last day, the last seven days, the last month, etc.). Recency data corresponds to a timestamp or other temporal indication of when the user agent engaged with the categories, keywords, or entities mentioned above. Location data corresponds to data relating to the location of the mobile device 302. Device data corresponds to data specific to the device 302 such as operating system, user agent type, device type, and the like. Event data corresponds to specific interaction behaviour that denote a behaviour (e.g., standard user interface interactions such as button clicking, scrolling, etc.).

Based on the above-described data, a third party (e.g., the third party 308) determines the rules to be used to assign a user agent to one or more of the group identifiers (which themselves are predetermined by the third party). For example, a third party creates a group identifier indicative of interest in local sports and sets a rule assigning a user agent to this group identifier based on the categorical data, location data, and the frequency data. The rule-based algorithm executes one or more third party rules by examining the user generated data and determine one or more matches between the user generated data and the one or more third party rules. If a match is encountered, then the user agent is assigned to the corresponding group identifier.

Alternatively, the prediction model comprises a machine learning model which predicts a group identifier given a set of input data (i.e. user generated data). The machine learning model looks at user agents that, despite not satisfying all the rules of a group identifier, exhibit a high level of similarity with users agents that do match such rules.

In one example implementation, a recommendation model based on a multi-layered neural network is used as the machine learning model. Any suitable collaborative filtering approach may be employed but preferably a Multinomial Variational Encoder is used.

At step 320, a first group identifier is obtained from the prediction model 304. The first group identifier is based on the user generated data and is indicative of a characteristic of a group of users.

A group identifier is obtained for a given set of user generated data, using the prediction model 304, and is indicative of a characteristic of a group of users without revealing any specific user identities. Example group characteristics which may be associated with a group identifier include geographical location (e.g. Coventry, UK), interests (e.g. cars), professional sector (e.g. legal), and the like. As such, a group identifier conceptually corresponds to a tag which can be determined from the user generated data and describes an intent, or characteristic, of the user.

A group identifier is a non-descriptive and temporary identifier. As such, the group characteristics are not determinable from the group identifier and the group identifiers are periodically updated. Consequently, a first group identifier may be reused across different group characteristics such that the first group identifier represents different group characteristics at different times. Beneficially, the group identifier is anonymous and thus freely exchangeable with third parties. By replacing personal data with group identifiers, personalisation services may be delivered whilst maintaining user privacy.

In some embodiments, a plurality of group identifiers are obtained from the prediction model. That is, the prediction model provides a plurality of different group identifiers from a given set of user generated data.

The use of a group identifier allows a third-party to offer content personalisation services which are directed to a specific group of users (with a set of shared characteristics), without requiring or allowing the third-party to obtain any personal information regarding the users within the group.

At step 322 the first group identifier is provided to the third-party 308.

The first group identifier enables a third-party, such as the third-party 308, to offer content personalisation to the user without exposing any private data associated with the user to the third-party. Personal data—both in terms of user identifiers and user generated data—are held at the device at not shared with a third-party. As such, the process described in FIG. 3 provides privacy-preserving content personalisation to a user by replacing personal data with anonymised data. This allows a user to receive content personalisation, and a third-party to offer personalisation services to a user, on the basis of an anonymised group identifier associated with the user.

In some embodiments, the third-party 308 at step 324 delivers content personalisation to the device 302 based on the first group identifier.

Examples of content personalisation offered to a user (or user agent) by a third-party, such as the third-party 308, include modifying the content of pages sent from a domain to a user, providing recommendations, and streamlining various processes, all based on one or more group identifiers associated with the user or user agent. For example, if the user or user agent is associated with a group identifier indicative of an interest in Japanese food, then the third-party can offer content personalisation to the user in the form of a list of recommended local Japanese restaurants. The user is thus provided with relevant and personalised content which can improve their experience whilst maintaining their privacy since only anonymised data is shared with the third-party.

As stated above, because the authentication server 306 does not collect any user generated data, and the authentication server 306 does not transfer any personal data to a third-party (e.g. the third-party 308), the user has control over their personal data whilst still allowing accurate tracking across domains. In particular, a user may subsequently withdraw consent to any data being collected in the future, even if initial consent was given. This is in contrast to existing solutions, which transfer personal data to third parties and make it difficult, if not impossible, for a data subject (e.g. user) to request access, modify, or delete their own data.

Figure 4:
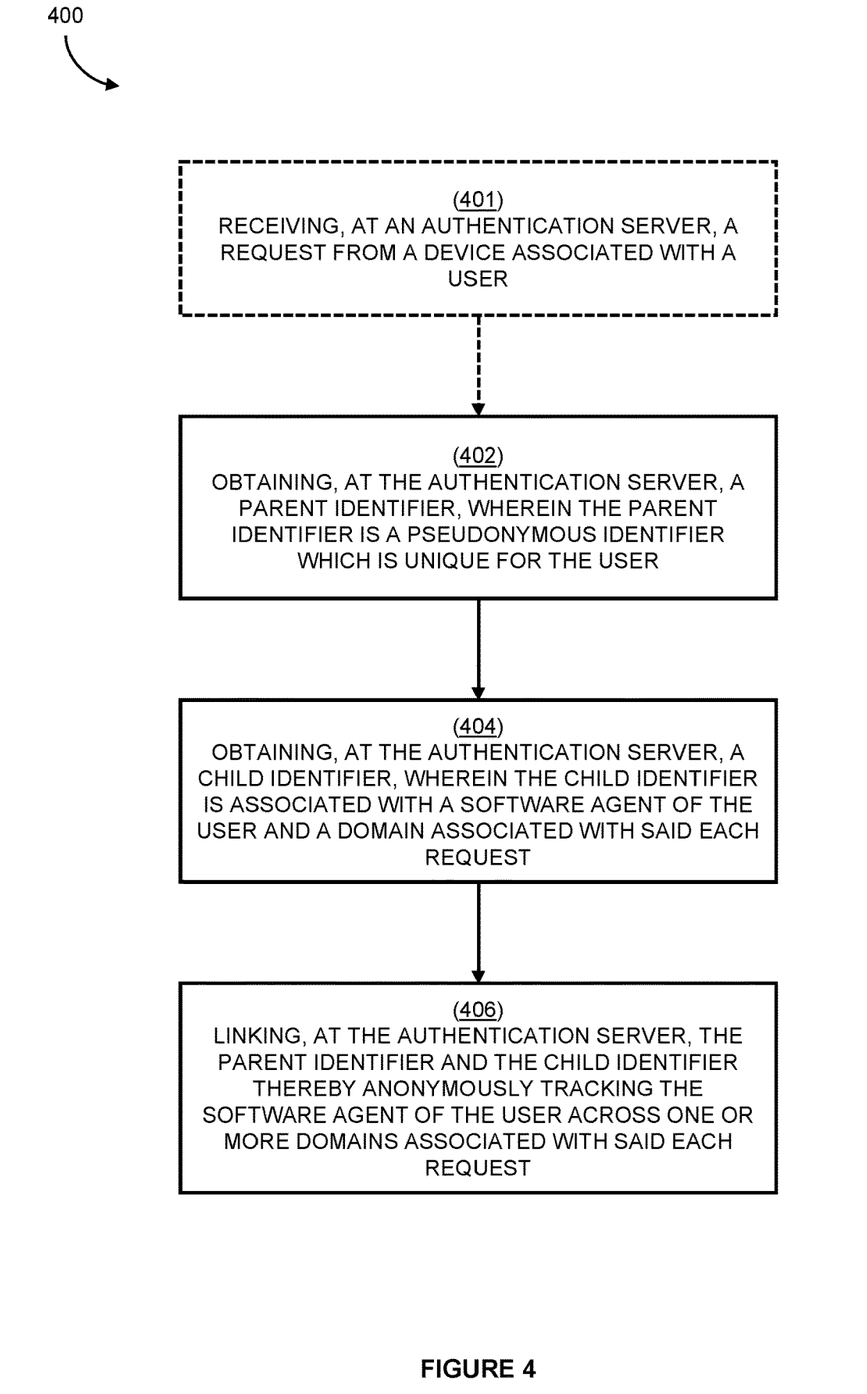
FIG. 4 shows a method for cross-domain user tracking according to an aspect of the present disclosure.

FIG. 4 shows a method 400 for privacy-preserving cross-domain user tracking according to an aspect of the present disclosure.

The method 400 comprises, for each request received at an authentication server from a device associated with a user, the steps of obtaining 402 a parent identifier, obtaining 404 a child identifier, and linking 406 the parent identifier and the child identifier.

In an embodiment, the method 400 further comprises the step of receiving 401 a request from a device associated with a user. The request is received at the authentication server and indicates that the user wishes to visit a domain. As such, the request is associated with the domain. As described in relation to FIG. 2 above, in some embodiments, prior to the request being received, a server associated with the domain (e.g. the server 204) communicates with the authentication server (e.g. the authentication server 206) to check if the user has consented to sharing data.

Referring once again to FIG. 4, the method 400 comprises the step of obtaining 402, at the authentication server, a parent identifier, wherein the parent identifier is a pseudonymous identifier which is unique for the user.

The parent identifier is an identifier which is uniquely associated with the user of the device. Alternatively, the parent identifier is uniquely associated with a user agent of the device associated with the user.

In one embodiment, obtaining the parent identifier comprises generating, at the authentication server, the parent identifier. The step of generating the parent identifier occurs in accordance with a determination, at the authentication server, that the parent identifier is stored on the device.

In an alternative embodiment, obtaining the parent identifier comprises sending, from the authentication server to the device, a request for the parent identifier and receiving, from the device, the parent identifier.

The method 400 comprises the step of obtaining 404, at the authentication server, a child identifier, wherein the child identifier is associated with a software agent of the user and a domain associated with said each request.

The child identifier is a first-party identifier that is associated both with the software agent of the user on the device and with the domain which the user wishes to visit. In some embodiments, the child identifier is associated with more than one domain such that the same child identifier is used across multiple domains.

In one embodiment, obtaining the child identifier comprises generating, at the authentication server, the child identifier. Alternatively, obtaining the child identifier comprises regenerating, at the authentication server, the child identifier in accordance with a determination that a predetermined condition has been met. The predetermined condition is met when a predetermined period of time has elapsed since the child identifier was previously generated.

The child identifier is generated according to a predetermined mathematical function. Examples of predetermined mathematical functions used to generate the child identifier include hash functions, fingerprinting functions, pseudorandom number generation functions, and the like.

In an alternative embodiment, obtaining the child identifier comprises sending, from the authentication server to the device, a request for the child identifier and receiving, from the device, the child identifier.

The method 400 comprises the step of linking 406, at the authentication server, the parent identifier and the child identifier thereby anonymously tracking the software agent of the user across one or more domains associated with said each request.

In an embodiment linking the parent identifier and the child identifier further comprises storing, at the authentication server, a link between the parent identifier and the child identifier in a persistent data store.

In embodiments where the parent identifier is generated by the authentication server, the method 400 further includes sending, from the authentication server, the parent identifier to the device.

Optionally, the parent identifier is sent to the device as a session token.

In embodiments where the child identifier is generated by the authentication server, the method 400 further includes sending, from the authentication server, the child identifier to the device.

Optionally, the child identifier is sent to the device as a session token.

Optionally, both the parent identifier and the child identifier are sent to the device in a single session token.

Figure 5:
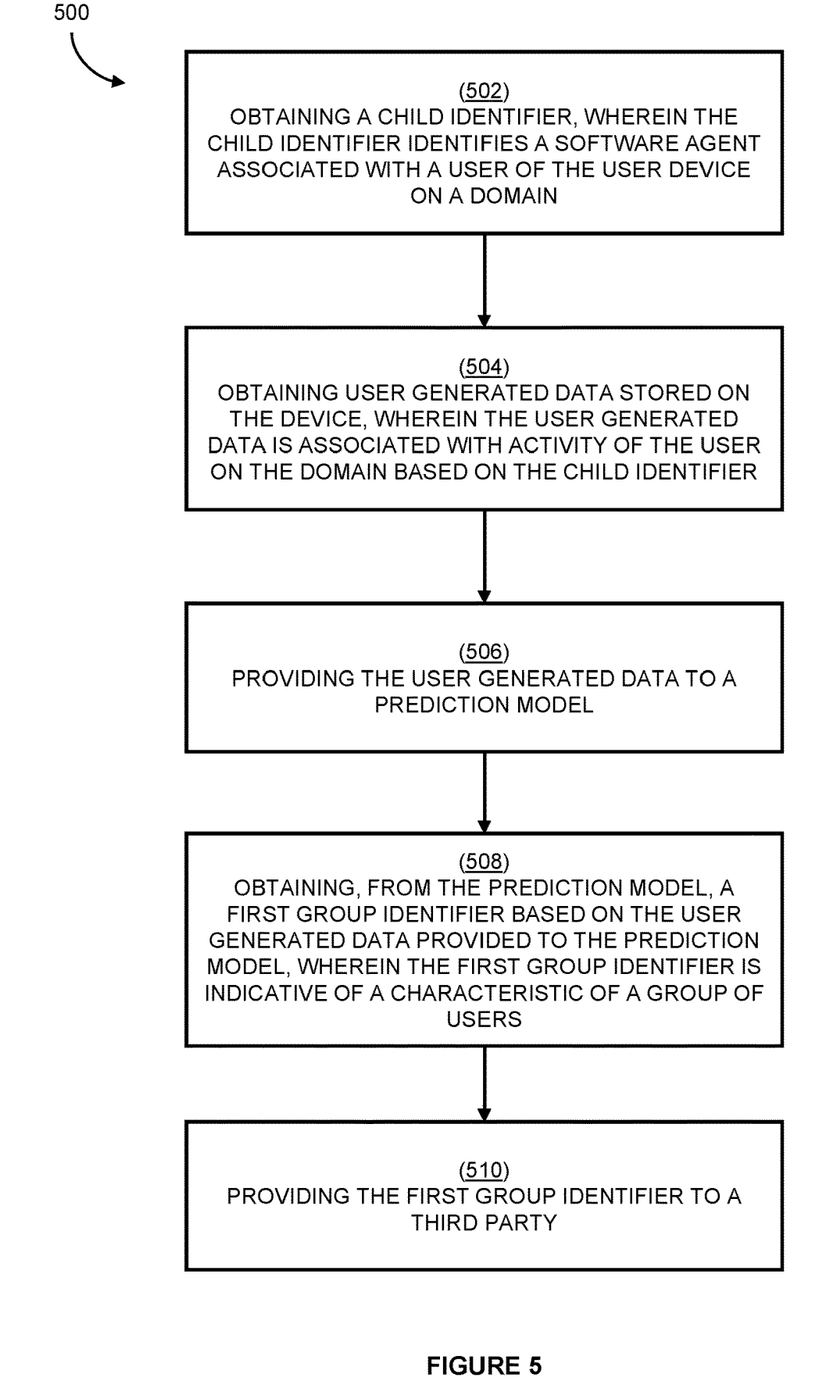
FIG. 5 shows a method implemented at a device according to an aspect of the present disclosure.

FIG. 5 shows a method 500 implemented at a user device according to an aspect of the present disclosure.

The method 500 comprises the step of obtaining 502 a child identifier, wherein the child identifier identifies a software agent associated with a user of the user device on a domain.

In one embodiment, obtaining the child identifier comprises sending, to an authentication server, a request indicating that the user device has requested to visit the domain, and receiving, from the authentication server, the child identifier.

The method 500 further comprises the step of obtaining 504 user generated data stored on the user device, wherein the user generated data is associated with activity of the user of the user device on the domain based on the child identifier.

The method 500 further comprises the step of providing 506 the user generated data to a prediction model.

The prediction model is stored on the user device. Alternatively, the prediction model is stored on a remote server.

The prediction model comprises a trained machine learning model such as a collaborative filtering model. Alternatively, the prediction model comprises one or more rules-based systems as described above in relation to FIG. 3.

The method 500 further comprises the step of obtaining 508, from the prediction model, a first group identifier based on the user generated data provided to the prediction model, wherein the first group identifier is indicative of a characteristic of a group of users.

The method 500 further comprises the step of providing 510 the first group identifier to a third-party.

Optionally, the method 500 further comprises storing the first group identifier on the software agent of the user device.

Figure 6:
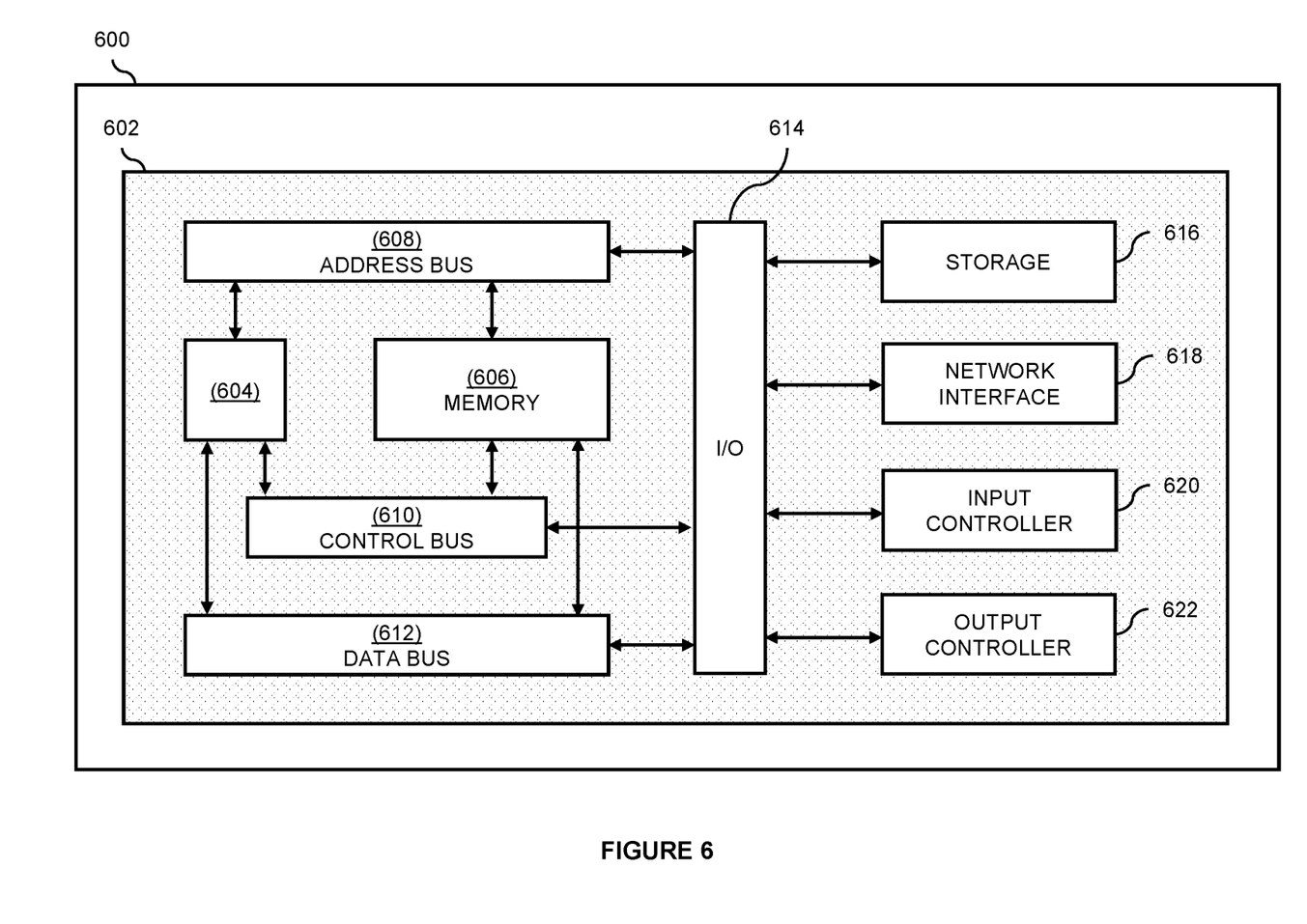
FIG. 6 shows an example computing system according to embodiments of the present disclosure.

FIG. 6 shows an example computing system for carrying out the methods of the present disclosure. Specifically, FIG. 6 shows a block diagram of an embodiment of a computing system according to example aspects and embodiments of the present disclosure.

Computing system 600 can be configured to perform any of the operations disclosed herein such as, for example, any of the operations discussed with reference to FIGS. 2 to 5. Computing system includes one or more computing device (s) 602. Computing device(s) 602 of computing system 600 comprise one or more processors 604 and memory 606. One or more processors 604 can be any general-purpose processor(s) configured to execute a set of instructions. For example, one or more processors 604 can be one or more general-purpose processors, one or more field programmable gate array (FPGA), and/or one or more application specific integrated circuits (ASIC). In one embodiment, one or more processors 604 include one processor. Alternatively, one or more processors 604 include a plurality of processors that are operatively connected. One or more processors 604 are communicatively coupled to memory 606 via address bus 608, control bus 610, and data bus 612. Memory 606 can be a random-access memory (RAM), a read-only memory (ROM), a persistent storage device such as a hard drive, an erasable programmable read-only memory (EPROM), and/or the like. Computing device(s) 602 further comprise input/output (I/O) interface 614 communicatively coupled to address bus 608, control bus 610, and data bus 612.

Memory 606 can store information that can be accessed by one or more processors 604. For instance, memory 606 (e.g. one or more non-transitory computer-readable storage mediums, memory devices) can include computer-readable instructions (not shown) that can be executed by one or more processors 604. The computer-readable instructions can be software written in any suitable programming language or can be implemented in hardware. Additionally, or alternatively, the computer-readable instructions can be executed in logically and/or virtually separate threads on one or more processors 604. For example, memory 606 can store instructions (not shown) that when executed by one or more processors 604 cause one or more processors 604 to perform operations such as any of the operations and functions for which computing system 600 is configured, as described herein. In addition, or alternatively, memory 606 can store data (not shown) that can be obtained, received, accessed, written, manipulated, created, and/or stored. In some implementations, computing device(s) 602 can obtain from and/or store data in one or more memory device(s) that are remote from the computing system 600.

Computing system 600 further comprises storage unit 616, network interface 618, input controller 620, and output controller 622. Storage unit 616, network interface 618, input controller 620, and output controller 622 are communicatively coupled via I/O interface 615.

Storage unit 616 is a computer readable medium, optionally a non-transitory computer readable medium, comprising one or more programs, the one or more programs comprising instructions which when executed by one or more processors 604 cause computing system 600 to perform the method steps of the present disclosure. Alternatively, storage unit 616 is a transitory computer readable medium. Storage unit 616 can be a persistent storage device such as a hard drive, a cloud storage device, or any other appropriate storage device.

Network interface 618 can be a Wi-Fi module, a network interface card, a Bluetooth module, and/or any other suitable wired or wireless communication device. In an embodiment, network interface 618 is configured to connect to a network such as a local area network (LAN), or a wide area network (WAN), the Internet, or an intranet. FIG. 6 illustrates one example computing system 600 that can be used to implement the present disclosure. Other computing systems can be used as well. Computing tasks discussed herein as being performed at and/or by one or more functional unit(s) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

In the present disclosure, references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The use of any and all examples, or exemplary language ("e.g.," "such as," "including," or the like) provided herein, is intended merely to better illuminate the embodiments and does not pose a limitation on the scope of the embodiments or the claims.

The skilled person will appreciate that the systems and methods of the present disclosure are not limited to a single programming language or paradigm. Indeed, the systems and methods of the present disclosure are applicable to any suitable programming language or environment, including but not limited to Java, C, C++, any suitable assembly language, Python, C #, JavaScript, Ruby, PHP, and the like.

Some embodiments described herein may relate to a computer storage product with a non transitory computer-readable medium (also can be referred to as a non-transitory processor-readable medium) having instructions or computer code thereon for performing various computer implemented operations. The computer-readable medium (or processor readable medium) is non transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a transitory computer program product, which can include, for example, the instructions and/or computer code discussed herein.

Some embodiments and/or methods described herein can be performed by software (executed on hardware), hardware, or a combination thereof. Hardware modules include, for example, a general-purpose processor, a field programmable gate array (FPGA), and/or an application specific integrated circuit (ASIC). Software modules (executed on hardware) can be expressed in a variety of software languages (e.g., computer code), including C, C++, Java, Ruby, Visual Basic, Python, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Numbered Statements of Invention

1. A computer-implemented method for privacy-preserving cross-domain user tracking, the computer-implemented method comprising:
    for each request received at an authentication server from a device associated with a user:
        obtaining, at the authentication server, a parent identifier, wherein the parent identifier is a pseudonymous identifier which is unique for the user;
        obtaining, at the authentication server, a child identifier, wherein the child identifier is associated with a software agent of the user and a domain associated with said each request; and
        linking, at the authentication server, the parent identifier and the child identifier thereby anonymously tracking the software agent of the user across one or more domains associated with said each request.
2. The computer-implemented method of statement 1 wherein obtaining the parent identifier comprises:
    generating, at the authentication server, the parent identifier.
3. The computer-implemented method of statement 2 wherein the step of generating the parent identifier occurs in accordance with a determination, at the authentication server, that the parent identifier is stored on the device.
4. The computer-implemented method of statement 1 wherein obtaining the parent identifier comprises:
    receiving, from the device, the parent identifier.
5. The computer-implemented method of statement 4 wherein obtaining the parent identifier further comprises:
    sending, from the authentication server to the device, a request for the parent identifier.
6. The computer-implemented method of any preceding statement wherein obtaining the child identifier comprises:
    generating, at the authentication server, the child identifier.
7. The computer-implemented method of any of statements 1 to 5 wherein obtaining the child identifier comprises:
    regenerating, at the authentication server, the child identifier in accordance with a determination that a predetermined condition has been met.
8. The computer-implemented method of statement 7 wherein the predetermined condition is met when a predetermined period of time has elapsed since the child identifier was previously generated.
9. The computer-implemented method of any of statements 1 to 5 wherein obtaining the child identifier comprises:
    receiving, from the device, the child identifier.
10. The computer-implemented method of any preceding statement wherein the child identifier is generated according to a predetermined mathematical function.
11. The computer-implemented method of any preceding statement wherein linking the parent identifier and the child identifier further comprises:
    storing, at the authentication server, a link between the parent identifier and the child identifier in a persistent data store.
12. The computer-implemented method of any preceding statement further comprising:
    sending, from the authentication server to the device, the child identifier as a session token.
13. A computer-readable medium comprising instructions which, when executed by one or more processors, cause the one or more processors to carry out the steps of any of statements 1 to 12.
14. A device comprising one or more processors and a memory storing instructions which, when executed by the one or more processors, cause the one or more processors to carry out the steps of any of statements 1 to 12.
15. A method implemented at a user device, the method comprising:

obtaining a child identifier, wherein the child identifier identifies a software agent associated with a user of the user device on a domain;

obtaining user generated data stored on the user device, wherein the user generated data is associated with activity of the user of the user device on the domain based on the child identifier;

providing the user generated data to a prediction model;

obtaining, from the prediction model, a first group identifier based on the user generated data provided to the prediction model, wherein the first group identifier is indicative of a characteristic of a group of users; and providing the first group identifier to a third-party.

16. The method of statement 15 wherein the prediction model is stored on the user device.

17. The method of either of statements 15 or 16 wherein the prediction model comprises a trained machine learning model.

18. The method any of statements 15 to 17 wherein obtaining the child identifier comprises:

sending, to an authentication server, a request indicating that the user device has requested to visit the domain; and receiving, from the authentication server, the child identifier.

19. The method of any of statements 15 to 18 further comprising:

storing the first group identifier on the software agent of the user device.

20. A computer-readable medium comprising instructions which, when executed by one or more processors, cause the one or more processors to carry out the steps of any of statements 15 to 19.

21. A device comprising one or more processors and a memory storing instructions which, when executed by the one or more processors, cause the one or more processors to carry out the steps of any of statements 15 to 19.

22. A system comprising:

a device comprising a software agent associated with a user; and an authentication server configured to receive one or more requests from the device and, for each of the one or more requests received from the device, is further configured to:

obtain a parent identifier, wherein the parent identifier is a pseudonymous identifier which is unique for the user;

obtain a child identifier, wherein the child identifier is associated with the software agent of the user and a domain associated with said each of the one or more requests; and link the parent identifier and the child identifier thereby anonymously tracking the software agent of the user across one or more domains associated with said one or more requests.

23. The system of statement 22 wherein the authentication server is further configured to:

send to the device a request for the parent identifier; and wherein the device is further configured to:

in response to receiving the request for the parent identifier, send to the authentication server a response to the request.

24. The system of statement 23 wherein the authentication server is further configured to:

receive from the device the parent identifier in accordance with a determination that the parent identifier is included as part of the response.

25. The system of statement 23 wherein the authentication server is further configured to:

generate the parent identifier in accordance with a determination that the parent identifier is not included as part of the response.

26. The system of any of statements 22 to 25 wherein the device is further configured to:

obtain user generated data stored on the device, wherein the user generated data is associated with activity of the user on the domain based on the child identifier;

provide the user generated data to a prediction model; and obtain, from the prediction model, a first group identifier based on the user generated data provided to the prediction model, wherein the first group identifier is indicative of a characteristic of a group of users.

27. The system of statement 26 wherein the prediction model comprises a rule-based algorithm.

28. The system of either of statements 26 or 27 wherein the device is further configured to:

provide the first group identifier to a third-party.

What is claimed is:

1. A computer-implemented method for privacy-preserving cross-domain user tracking, the computer-implemented method comprising:

for each request received at an authentication server from a device associated with a user:

obtaining, at the authentication server, a parent identifier, wherein the parent identifier is a pseudonymous identifier which is unique for the user;

obtaining, at the authentication server, a child identifier, wherein the child identifier is associated with a software agent of the user and a domain associated with said each request; and linking, at the authentication server, the parent identifier and the child identifier thereby anonymously tracking the software agent of the user across one or more domains associated with said each request.

2. The computer-implemented method of claim 1 wherein obtaining the parent identifier comprises:

generating, at the authentication server, the parent identifier.

3. The computer-implemented method of claim 2 wherein the step of generating the parent identifier occurs in accordance with a determination, at the authentication server, that the parent identifier is stored on the device.

4. The computer-implemented method of claim 1 wherein obtaining the parent identifier comprises:

receiving, from the device, the parent identifier.

5. The computer-implemented method of claim 4 wherein obtaining the parent identifier further comprises:

sending, from the authentication server to the device, a request for the parent identifier.

6. The computer-implemented method of claim 1 wherein obtaining the child identifier comprises:

generating, at the authentication server, the child identifier.

7. The computer-implemented method of claim 1 wherein obtaining the child identifier comprises:

regenerating, at the authentication server, the child identifier in accordance with a determination that a predetermined condition has been met.

8. The computer-implemented method of claim 7 wherein the predetermined condition is met when a predetermined period of time has elapsed since the child identifier was previously generated.

9. The computer-implemented method of claim 1 wherein obtaining the child identifier comprises:
receiving, from the device, the child identifier.

10. The computer-implemented method of claim 1 wherein the child identifier is generated according to a predetermined mathematical function.

11. The computer-implemented method of claim 1 wherein linking the parent identifier and the child identifier further comprises:
storing, at the authentication server, a link between the parent identifier and the child identifier in a persistent data store.

12. The computer-implemented method of claim 1 further comprising:
sending, from the authentication server to the device, the child identifier as a session token.

13. A non-transitory computer-readable medium comprising instructions which, when executed by one or more processors, cause the one or more processors to carry out the steps of:
for each request received at an authentication server from a device associated with a user:
obtaining, at the authentication server, a parent identifier, wherein the parent identifier is a pseudonymous identifier which is unique for the user;
obtaining, at the authentication server, a child identifier, wherein the child identifier is associated with a software agent of the user and a domain associated with said each request; and
linking, at the authentication server, the parent identifier and the child identifier thereby anonymously tracking the software agent of the user across one or more domains associated with said each request.

14. An authentication server comprising one or more processors and a memory storing instructions which, when executed by the one or more processors, cause the one or more processors to carry out the steps of:
receiving at the authentication server a request from a device associated with a user;
for each request received at the authentication server:
generating a parent identifier, wherein the parent identifier is a pseudonymous identifier which is unique for the user;
generating a child identifier, wherein the child identifier is associated with a software agent of the user and a domain associated with said each request; and
linking the parent identifier and the child identifier thereby anonymously tracking the software agent of the user across one or more domains associated with said each request.

15. A system comprising:
a device comprising a software agent associated with a user; and
an authentication server configured to receive one or more requests from the device and, for each of the one or more requests received from the device, is further configured to:
obtain a parent identifier, wherein the parent identifier is a pseudonymous identifier which is unique for the user;
obtain a child identifier, wherein the child identifier is associated with the software agent of the user and a domain associated with said each of the one or more requests; and
link the parent identifier and the child identifier thereby anonymously tracking the software agent of the user across one or more domains associated with said one or more requests.

16. The system of claim 15 wherein the authentication server is further configured to:
send to the device a request for the parent identifier; and
wherein the device is further configured to:
in response to receiving the request for the parent identifier, send to the authentication server a response to the request.

17. The system of claim 16 wherein the authentication server is further configured to:
receive from the device the parent identifier in accordance with a determination that the parent identifier is included as part of the response.

18. The system of claim 16 wherein the authentication server is further configured to:
generate the parent identifier in accordance with a determination that the parent identifier is not included as part of the response.

19. The system of claim 15 wherein the device is further configured to:
obtain user generated data stored on the device, wherein the user generated data is associated with activity of the user on the domain based on the child identifier;
provide the user generated data to a prediction model; and
obtain, from the prediction model, a first group identifier based on the user generated data provided to the prediction model, wherein the first group identifier is indicative of a characteristic of a group of users.

20. The system of claim 19 wherein the prediction model comprises a rule-based algorithm.

* * * * *